United States Patent
Roth

(12) 
(10) Patent No.: US 6,301,849 B1
(45) Date of Patent: Oct. 16, 2001

(54) ARTICLE FOR FLASHING OF EXTERIORWALL SURFACES

(76) Inventor: Richard L. Roth, 2465 William Ct., Atlanta, GA (US) 30360

( * ) Notice: Subject to any disclaimer, the term of this patent is extended or adjusted under 35 U.S.C. 154(b) by 0 days.

(21) Appl. No.: 09/227,716

(22) Filed: Jan. 8, 1999

Related U.S. Application Data

(63) Continuation-in-part of application No. 09/138,720, filed on Aug. 24, 1998.

(51) Int. Cl.[7] ............................................. E04B 5/48
(52) U.S. Cl. .................. 52/302.6; 52/302.7; 52/101; 52/302.1; 52/169.5; 239/200; 239/266; 239/269; 239/567
(58) Field of Search .................. 52/302.6, 302.7, 52/101, 97, 58, 302.1, 109.5; 239/200, 208, 266, 269, 542, 547, 145, 548, 567

(56) References Cited

U.S. PATENT DOCUMENTS

| | | | |
|---|---|---|---|
| 2,764,929 | * | 10/1956 | Tegarty .......................... 52/302.1 X |
| 2,779,065 | * | 1/1957 | Rehme ............................... 52/302.1 |
| 2,789,493 | * | 4/1957 | Riggle ........................... 52/302.1 X |
| 2,857,630 | * | 10/1958 | Bishop .............................. 52/302.1 |
| 5,044,821 | * | 9/1991 | Johnsen ........................ 52/169.5 X |
| 5,809,731 | * | 9/1998 | Reiss ................................... 52/533 |
| 5,884,435 | * | 3/1999 | David et al. ............................ 52/62 |

FOREIGN PATENT DOCUMENTS

| | | | |
|---|---|---|---|
| 404254638 | * | 9/1992 | (JP) .................................. 52/302.1 |
| 406129025 | * | 9/1992 | (JP) .................................. 52/302.1 |

* cited by examiner

*Primary Examiner*—Carl D. Friedman
*Assistant Examiner*—Phi Dieu Tran A
(74) *Attorney, Agent, or Firm*—Bernstein & Associates, P.L.; Jason A. Bernstein

(57) ABSTRACT

A flashing article for sealing out and draining away moisture from all types of stucco coated exterior wall surfaces, and for impeding the ingress of termites, rodents, and other animal infestation, having a generally flat sheet of a rigid material having a first section, a second section extending from and angled with respect to the first section, and a third section extending from and angled with respect to the second section, the third section having at least one aperture defined therein, and a hollow tube that passes through the aperture. A perforated conduit for distributing a pesticide or other fluid is carried by the second section and fastened to a conduit connector which extends through an aperture in the third section to provide access for injection of the pesticide.

20 Claims, 2 Drawing Sheets

ARTICLE FOR FLASHING OF EXTERIOR WALL SURFACES

CROSS-REFERENCE TO RELATED APPLICATIONS

This application is a Continuation-in-Part of U.S. patent application Ser. No. 09/138,720 filed Aug. 24, 1998, which is hereby incorporated herein by reference.

FIELD OF THE INVENTION

The present invention relates to stucco siding and trim on buildings, and more particularly, to a flashing article for sealing out and draining away moisture from stucco coated exterior wall surfaces, and for impeding the ingress of termites, rodents, and other animal infestation.

BACKGROUND OF THE INVENTION

There are three primary types of stucco systems commonly applied to exterior wall surfaces of buildings. Hard Coat Stucco has a wire mesh layer, a base coat of a concrete material (known as a "brown coat" or "scratch"), a finish coat of a similar composition as the base coat, and a coat of paint. Hard Coat is essentially the original stucco system that dates back several hundred years.

Exterior Insulation and Finishing System (known as "EIFS") has an insulation layer, a base coat of a concrete material with a fabric mesh, and a synthetic finish coat with a concrete material and a latex color. EIFS was introduced in the 1950's to provide a synthetic stucco coat that is less prone to cracking and that eliminates the need for a coat of paint, and to also provide an easy-to-install exterior layer of insulation.

European Stucco has a wire mesh layer, a base coat of a concrete material (known as a "brown coat" or "scratch"), and a synthetic finish coat with a concrete material and a latex color. European Stucco thus combines a synthetic finish coat with a stucco base coat. There are also a number of variations and combinations of these basic stucco systems in use.

Traditionally, the layers and coatings comprising a stucco system were applied to the wall down to below ground level and overlapping with the foundation, thereby sealing out moisture, leaving no wooden wall surface exposed, and providing an attractive decorative appearance. Stucco tends to crack, however, which allows moisture into the wall, in addition to moisture seeping into the wall around windows, doors, and other joints. The moisture seeps downward within the wall due to gravity and capillary action, and because the stucco coating is applied to below ground level and overlaps the foundation forming a seal, the moisture gets trapped inside the lower wall. The trapped moisture promotes dry rot, parasitic fungi, mildew, and other decaying of the lower portion of the wood wall, and invites and often results in termite infestation.

One attempted solution to the moisture problem has been to change building codes to require that eight inches of exposed wall be left above grade and below the bottom of the stucco coating for new buildings. The purpose was to ensure that homeowners and/or pest control experts could inspect for and easily detect the presence of termites by their trails in the dirt adjacent the bottom of the wall.

Unfortunately, this does not address the underlying problem of moisture trapped in the wall. For buildings with a foundation thick enough that the stucco coating overlaps the foundation, any moisture will still be sealed inside the wall. For buildings with a thinner foundation, a strip of the wooden wall is left exposed to the elements, resulting in more damp decaying wood low in walls and providing easier access for termites, small rodents, and the like into the building.

This attempted solution is extremely problematic in areas of the country such as the South where many homes are built on concrete slabs of approximately six inches thickness or less that extend only slightly above ground level. An eight inch strip of wooden wall can be left exposed between the top of the slab at about ground level and the bottom of the stucco coating at about eight inches above ground level. The situation is even worse in many cases where the stucco coating bottom is more than eight inches above ground level and/or where the slab top is slightly below ground level due to undulation of the ground. Furthermore, this attempted solution is entirely unsuitable for retrofit applications where termites have already infested the wood, because removing the stucco from below ground level to about eight inches above ground level simply provides the termites with easier access to channel into the house.

One known article directed to the moisture problem provides a "U" bracket with the open side up for fitting over the stucco and foam insulation undercoating, with numerous closely spaced holes in the bottom of the "U" for drainage. The article is mounted to the wall on one side of the "U" to form a seal.

There are significant drawbacks to this article, including that it can only be properly installed with the initial application of the stucco during construction, and cannot be properly installed in retrofit applications where an existing building has stucco. This is because the "U" bracket cannot be inserted between the outer surface of the wall and the inner surface of the existing insulation without significantly damaging the insulation and stucco. Additionally, in order for moisture to escape the wall and properly drain into the "U" bracket, foam insulation with a vertically grooved back must be used. This further compounds the drawback for retrofit applications, because groove-backed foam insulation was not available for installation on homes until about the year 1997, so "U" bracket retrofitting on any home built prior to this often results in damaged stucco and insulation, and still does not provide sufficient moisture drainage from the wall to avoid the moisture and infestation problems described heretofore.

Another significant drawback to the "U" bracket article, especially in the South where concrete slabs are commonly employed as discussed heretofore, is that it does not cover or seal any exposed wall between the bottom of the stucco/bracket and ground level. Furthermore, the drain holes encourage moisture to drain vertically down from the bracket and thus moisture settles into the ground immediately adjacent the wall. Additionally, the numerous holes in the bracket provide termites an easy avenue into the building.

Another known system provides a polymeric/concrete layer from below the top of the foundation down to the soil grade line, with a termite shield in an open space against the wall at the top of the foundation and a decorative cover strip for the open space. The polymeric/concrete layer and termite shield act as a barrier to termite intrusion, the cover provides for visual inspection for termites, and the opening allows for drainage of moisture. A significant drawback to this system is that termites can still gain access to a building by intruding through the opening and burrowing up through an outer layer of the wall to find an access route into the building.

Other known systems are directed to killing termites and other pests without addressing the underlying problem of moisture damage. Spraying pesticide on the ground adjacent the bottom of an exterior wall provides some protection, but is proscribed in many low-lying coastal areas, including but not limited to parts of Florida and Louisiana, because of seepage into the water table.

One known system provides a pesticide distribution system for a building with perforated tubing installed in the interior space of the building walls, with all the tubing branching from one trunk line. The trunk line extends through an exterior wall and provides for receiving a pesticide from outside the building. The pesticide drains through the perforations in the tubing and down to the floor within the interior space of the wall to create a barrier to termite intrusion. A significant drawback to this system is that termites can travel up the outer wall, over the tubing and into the building. Also, because the tubing is installed in the interior space of walls, termites can still infest and destroy outer layers of the wall such as substrata board, plywood, insulation board, and external gysum. The system is only applicable for new construction, with the tubing installed within the walls as the building is erected. Many industry groups, including various code writing authorities and stucco manufacturers, have been struggling unsuccessfully for some time to develop a pragmatic solution to the problem of moisture intrusion into stucco walls and the resulting moisture damage and termite infestation. Accordingly, there is a need for an article that provides for drainage of moisture from stucco coated exterior walls of a wood frame building, that provides for drainage out away from the walls instead of immediately adjacent to the walls, that covers and seals any otherwise exposed wooden wall surface between ground level and the bottom of the stucco, that provides a built-in system for distributing a pesticide around the perimeter of a building, and that significantly impedes ingress of termites, rodents, and other undesirable animal infestation. Such an article would be easily installable in a retrofit or new installation setting, would be installable on all applications, and would be a cost effective solution to the moisture and infestation problems described heretofore.

SUMMARY OF THE INVENTION

Generally described, the present invention provides an article for flashing of exterior wall surfaces, having a generally flat sheet formed into three sections, with one of the sections having an aperture defined therein and a hollow tube passing therethrough. A preferred embodiment provides a first section for attaching to the wall to form a seal. A second section extends from the first section at a first angle, and a third section extends from the second section at a second angle.

Preferably, the first section and the third section are generally parallel, and the first angle and the second angle are substantially 90 degrees. Optionally, the first angle and the second angles may be less than 90 degrees to create a grade to the second section for permitting moisture drainage in a direction away from the wall. The first angle may be provided larger than the second angle to provide the third section angled back toward the wall to apply pressure against the stucco for a better seal. Optionally, a longitudinal gasket may be provided on the first section or the second section for a better seal between the article and the wall.

The third section preferably has an aperture defined therein for receiving the tube. The tube is generally hollow, and thus capable of passing fluid therethrough. An outwardly extending annular flange is provided proximate to one end of the tube, the flange having an outer diameter greater than the diameter of the aperture. The tube passes through the aperture and extends from the third section, with the flange acting as a "keeper" to secure the tube from passing entirely through the aperture. A perforated conduit for distributing a pesticide or other fluid is carried by the second section, and a conduit connector extends through an aperture in the third section to provide access for injection of the pesticide.

To install the article, it is positioned so the first section overlaps with the foundation of the house and the third section overlaps with the stucco on the wall, the perforated conduit is run along the second section, and caulk or a like bonding and/or sealing compound is applied to the overlapping surface areas, to provide a seal preventing moisture intrusion and ingress by termites, rodents, and like animals.

The second section, the third section, and the wall thus form a sealed channel to capture moisture that seeps downward through the wall. The tube thus provides an extended route for the moisture to drain out from the channel and away from the wall, and creates a longer and more difficult route for access to the wall by animals. A pesticide is injected into the conduit connector, distributed through the conduit around the perimeter of the building, then seeps, mists, or sprays through the perforations to and form a barrier to termite intrusion into the building.

Accordingly, an object of the present invention is to provide an article for sealing out and draining moisture from stucco coated exterior walls of a building, which article can be installed in new construction applications or in retrofit applications with existing stucco.

It is another object to provide a sheet having three sections angled with respect to each other to cover and seal out moisture from an otherwise exposed wall surface between ground level and the bottom of the stucco, and that also acts as a barrier to seal off ingress routes for termites, rodents, and other animal infestation.

It is yet another object to provide an aperture in a section of the sheet and a hollow tube passing through the aperture to facilitate the draining of moisture out away from the wall instead of draining the moisture to the ground immediately adjacent the walls, and also to impede ingress by animals.

It is still a further object to provide a perforated conduit carried by the sheet to distribute pesticide to create a barrier beyond which termites can not pass to intrude into the building.

It is a further object to provide a sheet of material having a first section, a second section extending from and angled with respect to the first section, and a third section extending from and angled with respect to the second section, the third section having at least one aperture defined therein, and a hollow tube passing through the aperture, the tube capable of passing fluid therethrough, for sealing out and draining moisture from stucco coated exterior walls of a building.

These and other objects, features, and advantages of the present invention are discussed or apparent in the following detailed description of the invention, the accompanying drawings and the appended claims.

BRIEF DESCRIPTION OF THE DRAWINGS

The various features and advantages of the invention are apparent in the attached drawings, in which like reference characters designate the same or similar parts throughout the figures, and in which.

DETAILED DESCRIPTION OF THE PREFERRED EMBODIMENTS

Figure 1:
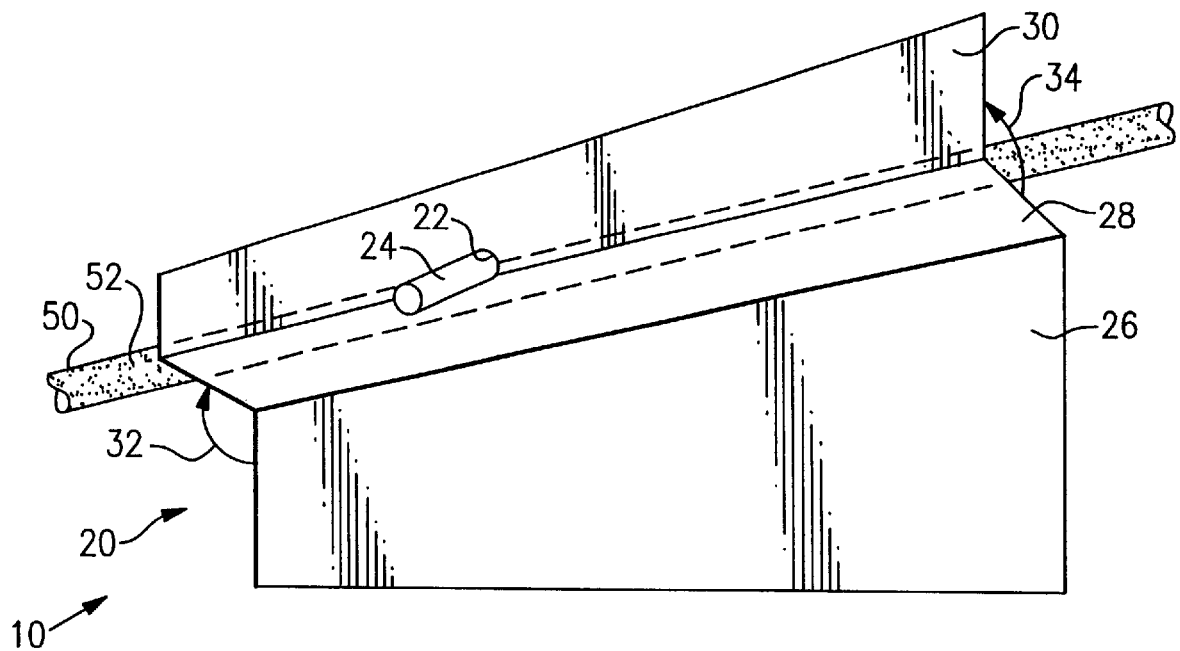
FIG. 1 is a perspective view of a length of a flashing article.

Referring now to FIG. 1, there is provided an article 10 for flashing of a joint 11 which comprises a lower end 13 of at least one layer 15 formed on an exterior wall 12 and an exposed portion 17 of said wall between said layer lower end 13 and a foundation 19 supporting and generally adjacent to said exposed wall portion. The at least one layer 15 is typically provided as a stucco layer 15a applied over an insulation layer 15b, which is applied to the wall 12 typically made of wood or other building materials known to those skilled in the art. The article 10 comprises a generally flat sheet 20 formed into three sections. The sheet is preferably made of a generally thin, rigid material such as sheet metal, plastic, composite, or the like, and generally rectangular in shape. Sheet metal is preferred because it is relatively malleable, strong, durable, and inexpensive, making it easy to form the sheet into the three sections, and at the same time sufficiently strong and durable to withstand deformation from forces imparted by persons, animals, weather, the weight of moisture, and like forces. Optionally, plastic may be used, however, plastic typically expands and contracts during normal seasonal heating and cooling more so than sheet metal, thereby deteriorating the seal between the wall and the first section.

A first section 26 is provided generally flat for attaching to the wall 12 to form a seal. The second section 28 extends from the first section 26 at a first angle 32, and the third section 30 extends from the second section 28 at a second angle 34. Preferably, the first section 26 extends generally downward from one end of the second section 28, and the third section 30 extends generally upward from the other end of second section 28, forming a shape somewhat similar to an "S" rotated at 90 degrees. Optionally, the first section 26 and the third section 30 may both extend generally upward or generally downward from the second section 28.

Preferably, the first section 26 and the third section 30 are generally parallel, and the first angle 32 and the second angle 34 are substantially 90 degrees, providing for ease of manufacture, storage, and transport. Optionally, the first angle 32 and the second angle 34 may be less than 90 degrees to create a grade to the second section 28 for permitting moisture drainage in a direction away from the wall 12. The first angle 32 may be provided larger than the second angle 34 to provide the third section 30 angled back toward the wall 12 to apply pressure against the stucco for a better seal. Optionally, a longitudinal gasket may be provided on the first section 26 or the third section 30 for a better seal between the article 10 and the wall 12.

The third section 30 preferably has at least one aperture 22 defined therein for receiving at least one tube 24. Optionally, the aperture 22 may be provided in the second section 28. The aperture 22 is preferably circular, though other shapes such as rectangular and the like may be employed. The aperture 22 is preferably formed by a drilling, pressing, or punching technique, though like methods may be employed.

More than one aperture 22 can be provided to accommodate more than one hollow tube 24 and thereby provide for greater drainage of moisture. The tube 24 is generally hollow, and thus capable of passing fluid 38 therethrough. The tube 24 preferably has an upper inlet end 31 and a lower outlet end 33. An outwardly extending annular flange 36 is provided proximate to the upper inlet 31 end of the tube 24, the flange 36 having an outer diameter greater than the diameter of the aperture 22. The tube 24 passes through the aperture 22 and extends from the third section 30, with the flange 36 acting as a "keeper" to secure the tube 24 from passing entirely through the aperture 22. The flange 36 is sufficiently close to an end of the tube 24, and the flange 36 thickness is sufficiently small, so that there is only a very small length of tube 24 extending beyond the sheet 20 on the wall 12 side, thereby permitting even small levels of moisture 38 to drain out through the tube 24.

The tube 24 has an outer diameter slightly less than the inner diameter of the aperture 22 to provide a sufficiently close fit, and the tube 24 has a sufficiently small inner diameter, to prevent accesstherethrough of termites, rodents, and other animals. Any gaps can be filled with a caulk or like sealing compound. The tube 24 preferably extends from the third section 30 at a slight angle downward from horizontal, sufficiently downward to facilitate the drainage of moisture 38 and other fluids through the tube 24, and sufficiently horizontal to drain moisture 38 and other fluids away from the wall 12. Thus, a shorter tube 24 can drain moisture away from the wall 12 and impede access to potential home invaders as well as a much longer tube 24.

The tube 24 is thus provided to facilitate drainage of moisture away from the wall 12, and to create a longer and more difficult path for such potential home invading animals. Without the tube 24, moisture would drain vertically downward through the aperture 22 and saturate the ground 40 immediately adjacent the bottom of the wall 12, preventing the wall 12 from drying and/or staying relatively free of moisture. Without the tube 24, termites, rodents, and other animals could travel through the aperture 22 in the sheet 20, and then behind the stucco 15a and insulation 15b, and through the wall 12 and into the home.

With the tube 24 and sectionally angled sheet 20, such potential home invaders are then left with no easy access to the interior of the wall 12 and into the home. For example, a termite would have to travel generally vertically up the wall 12, horizontally and/or downward away from the wall across the second section 28, horizontally and/or downward along the outer surface of the tube 24, then horizontally and/or upward along the inner surface of the tube 24, to get behind the stucco 15a and insulation 15b and into the wall 12.

Figure 3:
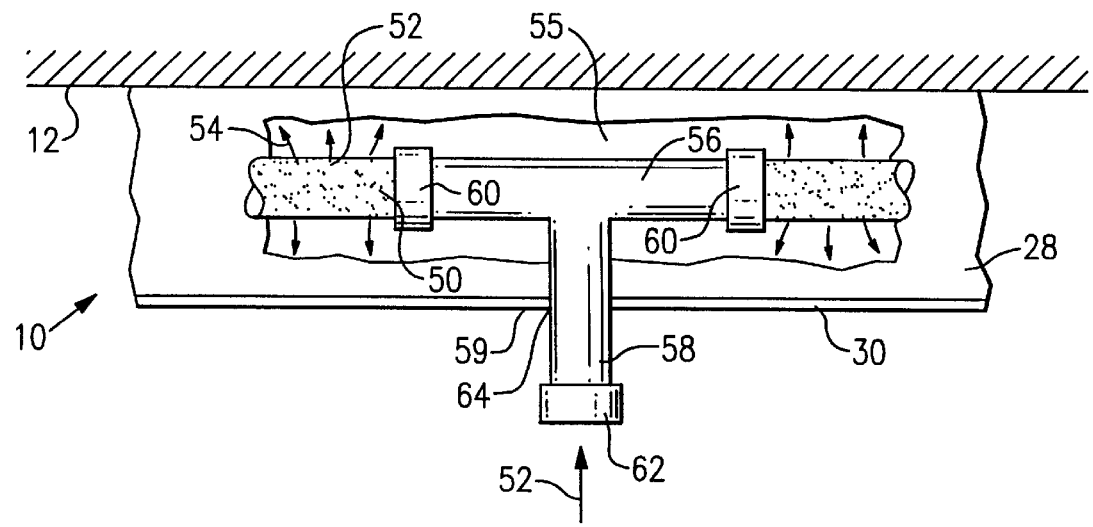
FIG. 3 is a plan view of a length of the flashing article.
Figure 4:
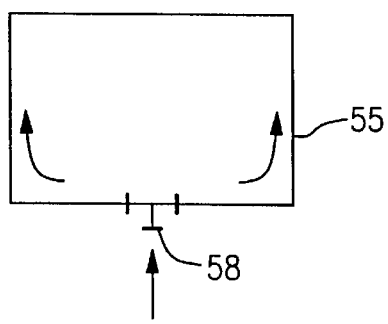
FIG. 4 is a plan view of a length of the flashing article.

Referring now to FIG. 3, a conduit 50 is provided having perforations 52 for distributing a pesticide 54 or other fluid or gas. The conduit 50 is preferably a hollow flexible tubing made of a hydrocarbon or like material through which termites can not eat. One such tubing commercially available is produced by Pro Seal™. The conduit 50 is carried by, and is generally parallel and coextensive with the second section 28. The conduit size is selected so that the conduit 50 may fit in the space between the third section 30, the exterior wall surface 12, the second section 28, and the stucco 42 and insulation 44 of the wall 12. The perforations 52 are sized to allow a fluid such as a pesticide 54 to seep, mist, or spray therethrough. The pesticide 54 then collects into a continuous pool to form a barrier area 55 beyond which termites can not pass (see FIG. 4). Furthermore, because the barrier area 55 is up off the ground, the article 10 provides for the effective use of a pesticide 55 in low-lying areas where pesticides may not be applied to the ground.

A conduit connector 56 is provided having an end 58 extending through an aperture 59 in the third section 30. The conduit end 58 provides a location for a termite company to inject a pesticide or other fluid into the conduit 50. The article 10 may be provided with only one aperture 59 and conduit connector 56 per installation, or with more than one aperture 59 and conduit connector 56 for larger buildings where the conduit would otherwise be required to carry a pesticide or other fluid over a longer distance. The article is provided in lengths, as described hereinafter, so many lengths may not include an aperture 59.

Figure 5:
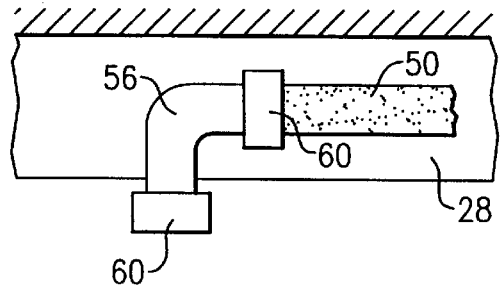
FIG. 5 is a schematic of a complete installation of the flashing article.

The connector 56 may be provided by a commercially available pipe fitting known to those with skill in the art, such as a fitting made of plastic, brass, steel, PVC and the like. The connector 56 may be provided in a T-shape or Y-shape for a three-way connection, an elbow shape for turning an angle (see FIG. 5), or in other shapes and configurations known by those skilled in the art. The connector 56 has end fasteners 60, such as threads, flanges with clamps, or the like, for attaching to the conduit 50. An end cap 62 may be provided to seal access to the conduit 50. Caulk 64 or a similar bonding and/or sealing compound may be provided to fill any gap between the connector end 58 and the aperture 22.

Figure 2:
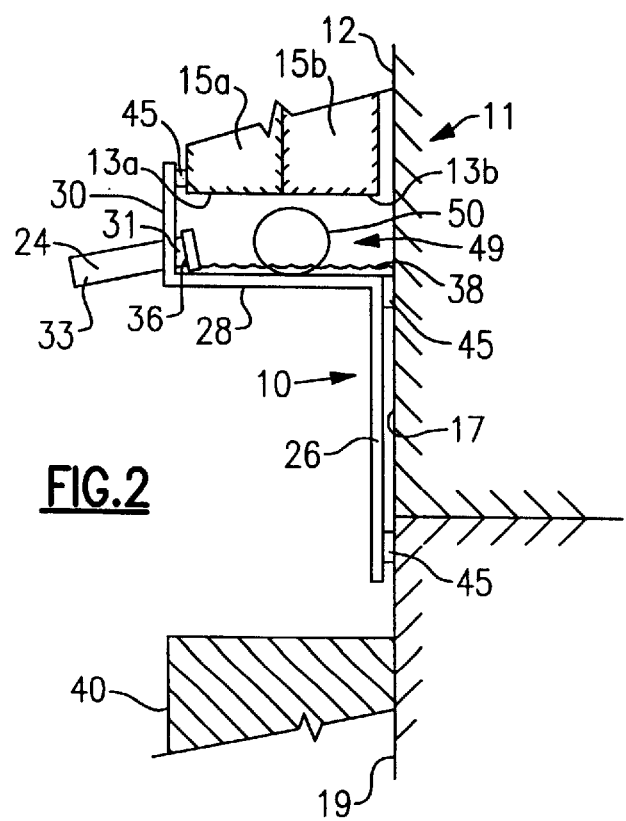
FIG. 2 is a side elevation view of the flashing article, showing a typical installation of the article on an exterior wall surface.

Referring to FIG. 2, the article 10 is preferably installed by attaching the first section 26 to the wall 12 of a house by conventional anchor screws or the like. An adhesive sealant 45 such as caulk, or a like bonding and/or sealing compound, is preferably applied to provide a moisture seal and to secure the article in place. The article 10 may be produced in a standard length, with the length then custom cut for each particular application. For many buildings, only one length of the article 10 will have an aperture 59 and conduit connector 56 for injecting pesticide or the like.

A length of the article 10 should be positioned so the first section 26 overlaps with the foundation 19 of the structure and the third section 30 overlaps with the stucco 15a on the wall, with the conduit 50 positioned on the second section 28, and an adhesive sealant 45 such as caulk or a like bonding and/or sealing compound is applied to the overlapping surface areas, to provide a seal preventing moisture intrusion and ingress by termites, rodents, and like animals. A length of the article 10 having an aperture 59 and conduit connector 56 is installed, and conduit 50 is connected to the ends of the conduit. The combination of the seals, the close fit between the aperture 22 and the tube 24, and the extension away from the wall 12 provided by the tube 24, provides no exposed wall 12 at or near ground level, and impeded ingress for termites, rodents, and other animals. Where a termite may on occasion navigate the only route into the wall by traveling in through a tube 24, the termite would then face a barrier area 55 of pesticide 54 on the second section 28 preventing intrusion into the building.

The second section 28, the third section 30, the lower ends 13a and 13b of stucco and insulation layers 15a and 15b and the wall 12 thus form a sealed interior space 49 or channel to capture moisture 38 that seeps downward through the wall 12. The tube 24 thus provides an extended route for the moisture 38 to drain out from the channel and away from the wall 12, and creates a longer and more difficult route for access to the wall 12 by animals.

Each length of the article 10 preferably has a number of apertures 22 and tubes 24 therethrough. The number of apertures 22 and tubes 24 may be increased, thereby permitting the use of smaller diameter tubes 24 to impede ingress by smaller animals. The dimensions of the article 10 may be selected based on the particular application. The height of the first section 26 may be selected based on the height of exposed wall 12 desired to be covered and sealed. The width of the second section 28 may be selected based on the thickness of the insulation 16 and stucco 14. The height of the third section 30 may be selected to accommodate the outer diameter of the conduit 50 and conduit connector 56 and to also provide a sufficient overlap with the stucco surface 42 to obtain a seal 45. In a typical installation, a number of lengths of the article 10 are installed end to end, with the joints sealed by caulk 45, or a like bonding and/or sealing compound.

The invention also provides a method for retrofitting the flashing article 10 of the present invention onto an existing building structure having at least one exterior wall surface 12 with at least one stucco 42 or like layer formed thereon. The method elements generally do not have to be performed in the order presented. The method comprises (a) providing at least a portion of the exterior wall such that the wall portion is exposed between a lower end of a layer formed on the wall and a foundation supporting the wall; (b) providing a flashing article comprising a generally flat sheet of a rigid material having a first section, a second section extending from the first section and angled with respect to the first section, and a third section extending from the second section and angled with respect to the first second; (c) overlapping at least a portion of a first section of a flashing article with at least a portion of the foundation; (d) sealingly attaching the first section of the flashing article to the foundation; (e) covering at least a portion of the exposed wall with the first section of the flashing article; (f) covering at least a portion of the exposed wall with a second section of the flashing article; (g) covering at least a portion of the exposed wall with a third section of the flashing article; (h) overlapping at least a portion of the layer with at least a portion of the third section of the flashing article; (i) sealingly attaching the third second section of the flashing article to the layer; j) collecting moisture on the second section of the flashing article, wherein the moisture drains down the wall or layer; (k) carrying the moisture along the second section of the flashing article; (l) and draining by gravity the moisture from the second section of the flashing article and away from the foundation through a tube extending through an aperture defined in the third section of the flashing article. Accordingly, there are a number of advantages provided by the present invention. The sheet 20 has three sections angled with respect to each other to provide the advantage of covering and sealing out moisture from an otherwise exposed wall 12 surface between ground 40 level and the bottom of the stucco 15a, and also acting as a barrier to seal off ingress routes for termites, rodents, and other animal infestation.

The aperture 22 in the sheet 20 and the hollow tube 24 passing therethrough provide the advantage of facilitating the drainage of moisture away from the wall 12, and of impeding ingress by animals.

The perforated conduit 50 and conduit connector 60 extending through third section 28 provide the advantage of a built-in distribution system for a pesticide 54 to form a continuous barrier 55 against termite ingress.

The sheet 20 of material having a first section 26, a second section 28 extending from and angled with respect to the first section 26, and a third section 30 extending from and angled with respect to the second section 28, the third section 30 having at least one aperture 22 defined therein, and the hollow tube 24 passing through the aperture 22, the tube 24 capable of passing fluid therethrough, provide the advantage of sealing out and draining moisture from stucco 15*a* coated exterior walls 12 in new construction applications or in retrofit applications with existing stucco 15*a*.

While the invention has been described in connection with certain preferred embodiments, it is not intended to limit the scope of the invention to the particular forms set forth, but, on the contrary, it is intended to cover such alternatives, modifications, and equivalents as may be included within the true spirit and scope of the invention as defined by the appended claims.

All patents, applications and publications referred to herein are hereby incorporated by reference in their entirety.

What is claimed is:

1. A building wall system, comprising:
   a) at least one wall surface with an exposed portion;
   b) at least one layer formed on said wall surface, said layer having a lower end;
   c) at least one foundation generally subjacent to said wall, said exposed wall portion being between said lower end of said layer and said foundation;
   d) a generally flat sheet of a rigid material having a first section covering at least a portion of said exposed wall and overlapping with at least a portion of said foundation, said first section sealingly attached to said foundation, a second section extending from said first section and angled with respect to said first section, said second section covering said lower end of said layer, and a third section extending from said second section and angled with respect to said second section, said third section having at least one aperture defined therein, said third section covering at least a portion of said exposed wall and overlapping with at least a portion of said layer generally adjacent said lower end thereof, said third section sealingly attached to said layer; and,
   e) a hollow tube associated with said third section and said aperture such that said tube passes through said aperture.

2. The article of claim 1, wherein said first and third sections are generally coplanar.

3. The article of claim 1, wherein said tube has an outwardly extending annular flange proximate to one end of said tube.

4. The article of claim 1, wherein said tube is capable of passing fluid therethrough.

5. The article of claim 1, wherein said first section and said second section form an acute angle.

6. The article of claim 1, wherein said third section and said second section form an acute angle.

7. The article of claim 1, wherein said first section, said second section, and said third section are substantially rectangular.

8. An article for flashing of exterior wall surfaces, comprising:
   a. a generally flat sheet of a rigid material having a first section, a second section extending from said first section and angled with respect to said first section, and a third section extending from said second section and angled with respect to said second section, said third section having at least one aperture defined therein;
   b. a hollow tube associated with said third section and said aperture such that said tube passes through said aperture; and,
   c. a perforated conduit capable of passing fluid therethrough, said conduit carried by and generally parallel to said third section, and a conduit connector having one end extending through an opening in said third section and at least one other end fastened to said conduit.

9. The article of claim 8, further comprising a perforated conduit carried by and generally parallel to said third section.

10. The article of claim 9, wherein said conduit and said conduit perforations are capable of passing fluid therethrough.

11. The article of claim 9, further comprising a conduit connector having one end extending through an opening in said third section and at least one other end fastened to said conduit.

12. The article of claim 11, further comprising an end cap received on said one end of said conduit connector.

13. An article for flashing of exterior wall surfaces, comprising:
   a. a generally flat sheet of a rigid material having a first section, a second section extending from said first section and angled with respect to said first section, and a third section extending from said second section and angled with respect to said second section, said third section generally coplanar to said first section, and said third section having at least one aperture defined therein;
   b. a hollow tube capable of passing fluid therethrough having an outwardly extending annular flange proximate to one end of said tube, said tube associated with said third section and said aperture such that said tube passes through said aperture; and,
   c. a perforated conduit capable of passing fluid therethrough, said conduit carried by and generally parallel to said third section, and a conduit connector having one end extending through an opening in said third section and at least one other end fastened to said conduit.

14. The article of claim 13, further comprising an end cap received on said one end of said conduit connector.

15. The article of claim 13, wherein said conduit connector is a T-shaped or elbow shaped connector.

16. A building wall system, comprising:
   a) at least one exterior wall surface with an exposed portion;
   b) at least one layer formed on and generally parallel to said wall, said layer having a lower end;
   c) a foundation supporting and generally adjacent to said exposed wall portion, said exposed wall portion being between said lower end of said layer and said foundation;
   d) a generally flat sheet of a rigid material having a first section covering at least a portion of said exposed wall and overlapping with at least a portion of said foundation, said first section sealingly attached to said foundation, a second section extending from said first section and angled with respect to said first section, said second section covering said lower end of said layer, and a third section extending from said second section and angled with respect to said second section, said third section having at least one aperture defined therein, said third section covering at least a portion of said exposed wall and overlapping with at least a portion of said layer generally adjacent said lower end thereof, said third section sealingly attached to said layer; and,
   e) a hollow tube capable of passing liquid therethrough and having and upper inlet end and a lower outlet end, said tube having an outwardly extending annular flange proximate to an upper end of said tube, said tube associated with said third section and said aperture such that said tube passes through said aperture with said lower outlet end at a lower position than said inlet end.

17. The article of claim 16, wherein said first section and said second section form an acute angle.

18. The article of claim 16, wherein said third section and said second section form an acute angle.

19. A method of draining moisture from an exterior wall, comprising:
   a) providing at least a portion of said exterior wall such that said wall portion is exposed between a lower end of a layer formed on said wall and a foundation supporting said walls;
   b) providing a flashing article comprising a generally flat sheet of a rigid material having a first section, a second section extending from said first section and angled with respect to said first section, and a third section extending from said second section and angled with respect to said first section, said article having at least one aperture defined therein;
   c) overlapping at least a portion of said first section of said flashing article with at least a portion of said foundation;
   d) sealingly attaching said first section of said flashing article to said foundation;
   e) covering at least a portion of said exposed wall with said first section of said flashing article;
   f) covering at least a portion of said exposed wall with said second section of said flashing article;
   g) covering at least a portion of said exposed wall with said third section of said flashing article;
   h) overlapping at least a portion of said layer with at least a portion of said third section of said flashing article;
   I) sealingly attaching said third section of said flashing article to said layer;
   J) collecting moisture on said second section of said flashing article, wherein said moisture drains down said wall or layer;
   K) carrying said moisture along said second section of said flashing article;
   L) draining by gravity said moisture from said second section of said flashing article and away from said foundation through a tube extending through an aperture defined in said third section of said flashing article.

20. The method of claim 19, wherein element a) comprises the act of removing a portion of said layer by cutting.

* * * * *